May 7, 1968 L. W. BLEIMAN 3,381,956

CARD MOVING MECHANISM

Filed Sept. 2, 1966

INVENTOR.
LEWIS W. BLEIMAN
BY
[signature]
Attorney

United States Patent Office 3,381,956

Patented May 7, 1968

3,381,956

CARD MOVING MECHANISM

Lewis W. Bleiman, Northbridge, Calif., assignor to Radio Corporation of America, a corporation of Delaware Filed Sept. 2, 1966, Ser. No. 576,927

7 Claims. (Cl. 271—68)

ABSTRACT OF THE DISCLOSURE

A flexible belt is employed to move a card a short distance, but not in the usual fashion. The belt, rather than lying in a plane parallel to the card for carrying the card on the belt surface, extends substantially perpendicularly to the card surface. To move the card, the end portions of the belt are driven toward the card so that the belt abuts an edge of the card. The direction of card movement is parallel to the card surface.

A feature of the present invention is the gentle handling of the cards by the belt. The belt, although moved at high speed to effect rapid engagement with and movement of the card, does not crush or permanently bend the edge of the card nor does the edge of the card, which may be stiff and of relatively narrow cross-section, damage the belt.

Figure 1:
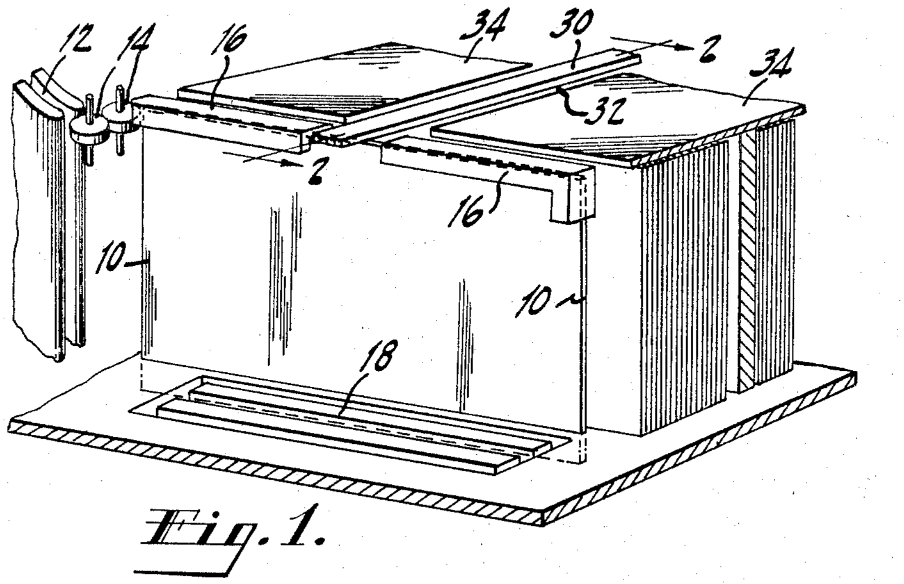
Figure 2:
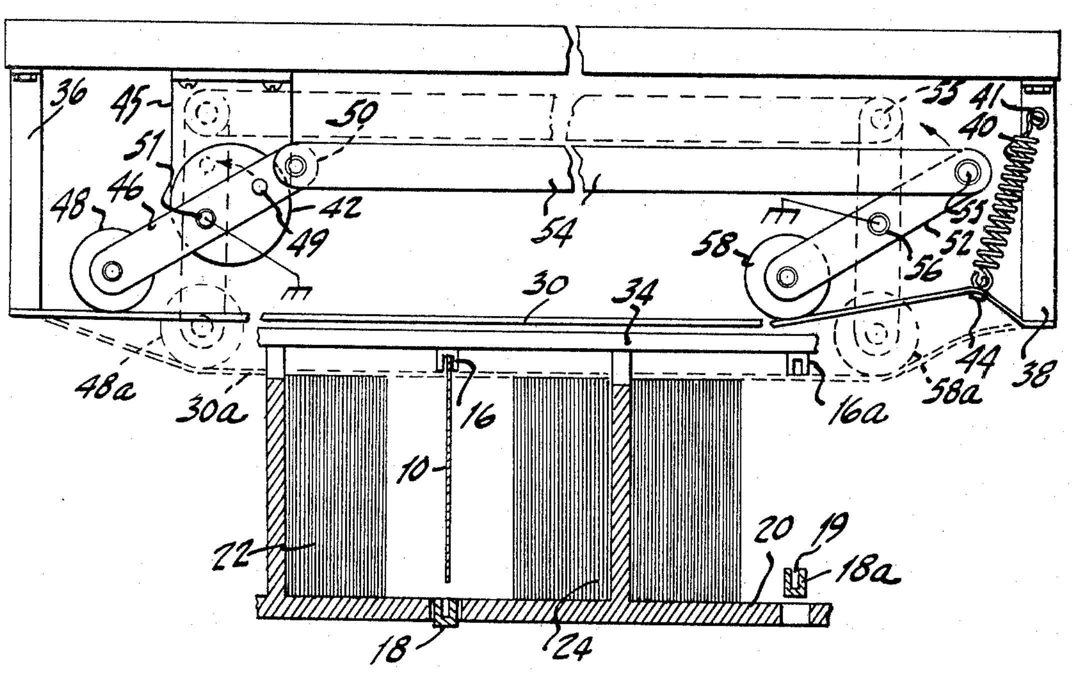

The invention is discussed in greater detail below and is shown in the following drawings of which:

FIGURE 1 is a perspective, partially broken away view of a portion of the arrangement of the present invention; and FIGURE 2 is a sectional view along line 2—2 of FIGURE 1.

In a particular memory system in which the present invention may be incorporated, information is recorded on cards formed of Mylar and coated with magnetic material. Each card is roughly 16 inches long and 4½ inches wide. Binary information is written on the cards by means of magnetic write heads along parallel tracks extending in the direction of the long dimension of the card.

The cards are stored in magazines and any card in any magazine randomly may be selected. When a card is selected, it is ejected from an end of the magazine and placed in a raceway, and there it is propelled to a read/write station. After the card is processed, it is returned to the magazine.

As explained in Patent No. 3,266,798, issued Aug. 16, 1966, to the present inventor, the initial position of a card upon its return to a magazine, is about ¼ inch above the remaining cards in the pack. The card then is pushed down to a position in alignment with the remaining cards and then moved, in a direction perpendicular to the card face, into one of the packs.

Some of the means for accomplishing the movements discussed above are shown in the present figures. A path 12 through which a card 10 is returned to its magazine is shown in FIGURE 1. The rollers, shown schematically at 14, propel the card into the magazine. The card rides in two channels, namely an upper channel 16 and a lower channel 18. Initially, the lower channel is in the position shown at 18*a* in FIGURE 2 and, in this position, its lowest surface 19 is about ¼ inch above the base 20 of the magazine. Therefore, the initial position of the card 10, upon its return to a magazine, is also about ¼ inch above the cards in the remainder of the deck. The card 10 of FIGURE 1 is so shown.

After the card is in the magazine, the lower channel 18 is caused to drop. The card then falls due to gravity, but this takes at least 40 milliseconds. To increase the operating speed of the system, it is desirable to reduce this time to 20 milliseconds or less. For this and other reasons it is necessary to push the card 10 down so that it aligns with the cards in decks 22 and 24. This invention is concerned with the push-down means.

Previously, the means employed to push the card down was a pusher plate such as shown at 48 in FIGURES 1 and 2 of the patent identified above. While this plate is operative and has given good service, it has been found, in practice, that the plate does have a number of disadvantages. The card system operates at very high speed, and all steps in the cycling of the card, including the movement of the pusher plate, must occur at high speed. At these speeds, the pusher plate strikes the edge of the card with great force and, after many selections of the card, the card edge sometimes becomes crushed or permanently bent. This means that the card has to be replaced. Moreover, as the card is relatively thin and is made of a stiff material, the pusher plate itself becomes damaged after many cycles of operation.

The improved card moving arrangement of the present invention substitutes for the pusher plate a belt 30. The belt (not shown to scale in the figures), in one practical design, is 0.19 inch wide and 0.03 inch thick and is made of nylon reinforced neoprene rubber. The belt is flexible but does not stretch to any great extent (1% or less under the design loads).

The belt is shown to be aligned with a slot 32 in the upper wall 34 of the side-by-side magazines and with a cut-out portion of the upper channel 16. (If desired, the upper wall 34 of the magazine may be omitted.) The belt is supported at its ends by supporting posts 36 and 38. The belt is biased by a spring 40 which is fixed to the chassis at 41 and is fixed to the belt at 44.

The drive mechanism for the belt comprises a solenoid 42 which is mounted to the chassis by a bracket 45. The solenoid drives a yoke 46 which supports a roller 48. The connection of the yoke to the solenoid is via axle 49 and the fulcrum about which the yoke is driven is axle 51 which is fixed to the chassis. The opposite end 50 of the yoke is pivotally secured to a second yoke 52 by means of a drive bar 54. The second yoke is pivotally connected at 55 to drive bar 54 and is rotatably mounted on an axle 56. The latter is fixed to the chassis. The yoke 52 supports a second roller 58 at its free end. Both yokes have the same dimensions.

The solenoid 42 normally maintains the yokes 46 and 52 in the positions shown. In these positions, the rollers 48 and 58 support the belt in a position higher than that of the incoming card 10. The spring 40, which is under tension, maintains the belt taut.

After the card 10 is in the position shown in FIGURES 1 and 2, the lower channel 18 is moved downwardly to the position shown in FIGURE 2 and the solenoid 42 is energized. The yoke 46 now moves through a predetermined angle and the drive bar 54 rotates the yoke 52 about axle 56 through the same angle. The rollers 48 and 58 are moved by their yokes along the belt to the positions shown at 48*a* and 58*a*, and the opposite end portions of the belt move downwardly as indicated at 30*a* by the dashed lines. The belt abuts the upper edge of card 10 and pushes the card down to a position aligned with that of the cards in decks 22 and 24.

In one practical design, the card accelerates at 12 times the acceleration of gravity and the speed of the belt when it strikes the card is 30 inches per second. The movement of the card to a position aligned with the remaining cards is accomplished in about 10 milliseconds.

An important feature of this way of moving the card is the gentle handling of the card by the belt. The belt is flexible and, rather than acting like a hammer, gently pushes the card into position without damaging the card edge. Moreover, it is found, in practice, that the card does not cut into the belt and the life of the belt is substantially longer than that of the plate which was previously used.

Employing the belt, 35,000 passes have been made on a card with no visible damage to the card and 3,000,000 cycles of the belt have been attained without damage to the belt. With the arrangement of the prior art, 10,000 passes caused damage to a card and a resilient pad on the pusher plate became permanently deformed before 100,000 passes were reached.

After the card is aligned with the cards in the remainder of the pack, transfer plates, shown in the patent mentioned above, move the card into one of the two packs. These play no part in the present invention and therefore are not illustrated. Other details of the magazine such as the bottom rests 42 and 44 for the card, which are shown realisticly in FIGURE 1 of the patent, are shown in a more schematic way in the present FIGURE 1. These rests are shown, for example, in the present FIGURE 1 as merely the bottom wall of the magazine.

While the present invention has been illustrated in terms of a system which employs plastic cards coated with magnetic material, it is to be understood that it is also applicable to other types of cards. As one example, the cards may be made of paper or the like.

What is claimed is:

1. An arrangement for moving a card in a direction parallel to the card surface comprising, in combination:
a belt, one part of which extends substantially perpendicularly to the card surface and across one edge of the card; and
means located at the opposite end portions of said part of said belt for moving said opposite end portions toward the card a distance sufficient to cause the belt to abut said one edge of the card and to move the card.

2. An arrangement for moving a card in a direction parallel to the card surface comprising, in combination:
a belt secured at its opposite ends to fixed supports and one part of which extends substantially perpendicularly to the card surface and across one edge of the card; and
means located at the opposite end portions of said part of said belt for moving said opposite end portions toward the card a distance sufficient to cause the belt to abut the edge of the card and to move the card, said means comprising a pair of elements which are movable relative to said supports and which abut the end portions of said part of said belt.

3. An arrangement as set forth in claim 2, wherein said movable elements comprise lever arms which are rotatable through an angle.

4. An arrangement as set forth in claim 3, wherein said movable elements each comprise a lever arm and a roller fixed to one end portion of the lever arm and in contact with said belt, and further including means for rotating said lever arms through an angle so that the rollers at the ends of the lever arms ride on the belt and move the belt toward the card.

5. An arrangement as set forth in claim 2, further including a spring secured at one end to a fixed support and secured at the other end to the belt for maintaining the portion of the belt which extends between the movable elements taut.

6. An arrangement as set forth in claim 2, wherein said belt is made of nylon reinforced rubber.

7. An arrangement for moving a card in a direction parallel to the card surface comprising, in combination:
a pair of spaced axles;
a pair of arms respectively rotatably mounted at regions between the ends thereof to said axles;
a rigid bar pivotally connected at its opposite ends to one end portion of the two arms;
two rollers respectively mounted to the opposite end of the two arms;
a flexible belt riding on the two rollers and fixed at its two ends to supports, the portion of said belt between the two rollers lying adjacent to an edge of the card and extending substantially perpendicularly to the card surface;
a spring secured at one end to a support and secured at its other end to a portion of the belt outside of the two rollers for maintaining the portion of the belt between the two rollers taut; and
drive means coupled to one of the arms for rotating that arm about its axle through an angle such that the two rollers ride on the belt and move the belt toward the card a distance sufficient to cause the belt to abut the edge of the card and to move the card.

References Cited

UNITED STATES PATENTS

| | | | |
|---|---|---|---|
| 2,815,949 | 12/1957 | Faeber | 271—64 |
| 3,266,798 | 8/1966 | Bleiman | 271—64 |
| 3,284,081 | 11/1966 | Huck | 271—68 |

RICHARD E. AEGERTER, *Primary Examiner.*